United States Patent
Ruef et al.

(10) Patent No.: US 7,945,487 B2
(45) Date of Patent: May 17, 2011

(54) METHOD AND APPARATUS FOR CERTIFIED SECONDARY MARKET INVENTORY MANAGEMENT

(75) Inventors: Josef T. Ruef, Alexandria, VA (US); John P. Brown, Alexandria, VA (US)

(73) Assignee: Arrow Electronics, Inc., Melville, NY (US)

( * ) Notice: Subject to any disclaimer, the term of this patent is extended or adjusted under 35 U.S.C. 154(b) by 1051 days.

(21) Appl. No.: 11/727,951

(22) Filed: Mar. 29, 2007

(65) Prior Publication Data

US 2008/0243704 A1  Oct. 2, 2008

(51) Int. Cl.
G06Q 30/00 (2006.01)
(52) U.S. Cl. .................................................... 705/27.1
(58) Field of Classification Search ................ 705/26, 705/27, 27.1
See application file for complete search history.

(56) References Cited

U.S. PATENT DOCUMENTS

| | | | |
|---|---|---|---|
| 6,108,639 A * | 8/2000 | Walker et al. .................... 705/26 |
| 6,236,977 B1 | 5/2001 | Verba et al. |
| 6,260,024 B1 | 7/2001 | Shkedy |
| 6,496,809 B1 | 12/2002 | Nakfoor |
| 6,643,666 B1 | 11/2003 | Kernz |
| 6,904,410 B1 | 6/2005 | Weiss et al. |
| 6,915,274 B2 | 7/2005 | Abhyanker |
| 6,922,676 B2 | 7/2005 | Alnwick |
| 6,957,186 B1 | 10/2005 | Guheen et al. |
| 7,027,623 B2 | 4/2006 | McWilliam |
| 7,042,335 B2 | 5/2006 | Franks |
| 7,054,844 B2 | 5/2006 | Fletcher et al. |
| 7,062,453 B1 | 6/2006 | Clarke |
| 7,113,922 B2 | 9/2006 | Fowler |
| 7,130,829 B2 | 10/2006 | Banerjee et al. |
| 7,165,041 B1 | 1/2007 | Guheen et al. |
| 7,167,844 B1 * | 1/2007 | Leong et al. .................... 705/80 |
| 7,172,117 B2 | 2/2007 | Moore |
| 7,403,915 B2 * | 7/2008 | Bundy et al. .................... 705/27 |
| 2001/0034694 A1 | 10/2001 | Elias |

(Continued)

OTHER PUBLICATIONS

Peter Coffee, "'Provenance' for Calculations; A "Provenance," documenting the origin and the chain of ownership of an art object to ensure its authenticity, is also good to have in the case of a complex calculation used in designing a product ," eWeek, Sep. 13, 2004. vol. 21, Iss. 37; p. 64.*

(Continued)

*Primary Examiner* — Jeffrey A Smith
*Assistant Examiner* — Brandy Zukanovich
(74) *Attorney, Agent, or Firm* — Rader, Fishman & Grauer PLLC

(57) ABSTRACT

A certified secondary market inventory platform maintains a certified catalog of items for sale on a secondary market. Certified items are tracked by the platform and have a verified chain of custody between the manufacturer and the current owner. The certified catalog of items is presented anonymously, such that current owners of certified items are not revealed to potential buyers. Anonymity also extends to fulfillment, with shipment of a certified item to a buyer being performed without revealing the buyer and the current owner to each other. Verification of the chain of custody may, for example, include evidence such as a goods-received note corresponding to a shipment of the certified item from the manufacturer to the current owner, or a shipping notification from the manufacturer. A physical audit may also be conducted in association with publication of the certified catalog of items, as a pre-requisite for such publication.

16 Claims, 7 Drawing Sheets

U.S. PATENT DOCUMENTS

| | | | |
|---|---|---|---|
| 2001/0047340 A1 | 11/2001 | Snow et al. | |
| 2001/0053949 A1 | 12/2001 | Howes et al. | |
| 2002/0052809 A1 | 5/2002 | Toedtli | |
| 2002/0156689 A1 | 10/2002 | Spalding | |
| 2002/0169640 A1* | 11/2002 | Freeland | 705/4 |
| 2002/0174035 A1 | 11/2002 | Stern et al. | |
| 2003/0014342 A1* | 1/2003 | Vande Pol | 705/36 |
| 2003/0050891 A1 | 3/2003 | Cohen | |
| 2003/0061150 A1 | 3/2003 | Kocher et al. | |
| 2003/0083949 A1 | 5/2003 | Kar | |
| 2003/0191694 A1 | 10/2003 | Vonfeldt et al. | |
| 2003/0195820 A1 | 10/2003 | Silverbrook et al. | |
| 2003/0204449 A1 | 10/2003 | Kotas et al. | |
| 2003/0225702 A1 | 12/2003 | Martin et al. | |
| 2004/0103055 A1 | 5/2004 | Butler | |
| 2004/0107125 A1* | 6/2004 | Guheen et al. | 705/7 |
| 2004/0111619 A1 | 6/2004 | Laurie et al. | |
| 2004/0230492 A1 | 11/2004 | Park | |
| 2005/0049930 A1 | 3/2005 | Sampark et al. | |
| 2005/0103840 A1 | 5/2005 | Boles | |
| 2005/0216360 A1 | 9/2005 | Osterer | |
| 2005/0240496 A1 | 10/2005 | Davis et al. | |
| 2006/0036531 A1* | 2/2006 | Jackson et al. | 705/37 |
| 2006/0049251 A1 | 3/2006 | Zimet | |
| 2006/0111986 A1 | 5/2006 | Yorke et al. | |
| 2006/0116900 A1 | 6/2006 | Jensen | |
| 2006/0165260 A1 | 7/2006 | Vanjani et al. | |
| 2006/0200403 A1 | 9/2006 | Friss | |

OTHER PUBLICATIONS

Written Opinion of the International Searching Authority; International Application No. PCT/US2008/057311; International Filing Date: Mar. 18, 2008.

* cited by examiner

METHOD AND APPARATUS FOR CERTIFIED SECONDARY MARKET INVENTORY MANAGEMENT

BACKGROUND OF THE INVENTION

1. Field of the Invention

This invention relates generally to secondary markets and more particularly to a system for publishing surplus and procuring shortage items in a secondary market.

2. Description of the Related Art

Chronic errors in demand forecasting regularly leave companies throughout supply chains in various industries with either excess inventories or shortages. For example, the management of electronic component inventory presents such problems. Companies currently resolve these imbalances by turning to the secondary market. In the secondary market buyers purchase components outside of both manufacturer direct and franchised distribution channels, generally on an unscheduled basis. Because of the impossibility of inspecting each component sourced from the secondary market, individual buyers do not have any protection. Particularly, there is a great deal of fraud in the electronic component secondary market, with either outright counterfeit items or refurbished items being fraudulently or unwittingly sold as new items. Other examples include chemicals, pesticides, automotive parts, aerospace parts, and medical supplies. These and other secondary markets are examples where fraud and related issues merit special caution when transacting in such markets.

Secondary markets are also typically very fragmented, meaning that buyers and sellers must maintain corresponding contacts for different brokers and suppliers, with various problems related to authentication, information security, and other issues. Moreover, there is no suitable single location where buyers and sellers can easily make various inventory items available during periods of excess and seek available items during periods of shortage. Brokers are available for certain categories of parts, but brokers also offer inconsistent results. As a result of this fragmented market, companies must rely on individuals with potentially incomplete and inconsistent knowledge of the hodgepodge of contacts available to buy and sell items. Accordingly, there is neither efficiency nor predictability in terms of buying and selling inventory items.

Still another problem is the need for anonymity. In a competitive marketplace, companies have no interest in having competitors know of their inventory shortages or excesses. Knowledge of a shortage could easily be used to a competitor's advantage, such as by purchasing parts to prevent the completion of corresponding customer orders. Similarly, knowledge of excess may allow competitors to better appreciate a competitive landscape, with the ability to adjust pricing or other marketing efforts accordingly.

Associated to the anonymity issue is the highly sensitive data that companies hold with regard to their inventory and corresponding management of that inventory. If a company were to allow an interface with a platform for buying and selling items, an additional problem is the desire to protect this information and to keep it confidential.

Increasing usage of the Internet has created a variety of vehicles for buying and selling goods in secondary markets. Commonly known examples of these are EBay and StubHub. EBay is a well known platform where individuals or companies may list items for auction and sometimes immediate sale. StubHub is a similar platform, specifically dedicated to event tickets. These platforms have built substantial, searchable databases of items. However, while these platforms are useful for individuals and certain other buyers and sellers of goods, they are in no way adequate or acceptable for the purchase and sale of items in secondary markets where high levels of predictability, authenticity and anonymity are sought in connection with competitive business activities. For example, EBay is not an acceptable secondary market solution for large scale buyers and sellers of electronic components. For one, there is virtually no predictability as to the quality or authenticity of these types of parts in an EBay-type solution. There are certain features such as seller ratings and perhaps some level of guarantee for certain purchases, but these do not address the need of buyers to have goods of known origin, quality and status (e.g., "new", "refurbished"). Sellers may assert such conditions, but the responsibility rests with the seller and there is little or no ability to verify the authenticity of the goods or the corresponding seller representations.

Additionally, the level of anonymity in these platforms is inadequate. Typically, a buyer and seller are connected at the conclusion of an auction or purchase transaction, with the seller being responsible to ship items directly to the buyer. Some mechanisms have been developed to allow sellers to generate and print shipping labels used to ship items, but the seller still knows exactly to whom the items will be shipped. Thus, even if the seller's information does not appear as the shipping address on the label, which provides some protection for the seller, the anonymity of typical auction or purchase portals remains inadequate.

Yet another problem with such solutions is that they do not present items in a fashion that allows efficient assessment of available inventory. This is particularly problematic in various secondary markets where parts can have a variety of corresponding identification numbers (even if they are considered "identical" for the purpose of using them in certain applications, such as is the case where different manufacturers provide an item). This means that searches require a "hit or miss" approach wherein items might be iteratively sought using a keyword or part number search strategy. Additionally, searches typically require the buyer to sift through irrelevant "hits", and to repeat searches essentially from scratch where an initial effort to find a part fails or produces an exhaustive list with numerous irrelevant items shrouding the sought-after items.

Finally, none of these systems, whether brokers or EBay-type platforms, offers any kind of true inventory management, wherein a buyer or seller may organize inventory, identify shortages and excesses, and interface with a system to automatically address and resolve such shortages and excesses.

Accordingly, what is needed is a platform that provides secondary market inventory management with access to items having certified authenticity. What is also needed is a platform that accommodates this while retaining anonymity, not only with regard to the presentation of available inventory but throughout transaction fulfillment. What is also needed is a platform that attains these goals with a commonly accessible interface for presenting available inventory and reviewing the available inventory of others, again in an anonymous fashion.

SUMMARY OF THE INVENTION

The present invention accommodates presentation of certified secondary market inventory and corresponding purchase and sale of the same.

In one embodiment, this entails maintaining a certified catalog of items for sale on a secondary market, wherein the certified catalog of items includes at least one certified item available from a current owner, the certified item being associated with item identification information and having a verified chain of custody between the manufacturer of the certified item and the current owner. Available items in the certified catalog are presented anonymously, such that the current owner of the certified item is not revealed to potential buyers. Once an item is selected for purchase, the transaction is also fulfilled anonymously, shipment of the certified item to the buyer without revealing the buyer and the current owner to each other in association therewith.

In one example, verification of the chain of custody includes evidence comprising a goods-received note corresponding to a shipment of the certified item from the manufacturer to the current owner. The evidence may also comprise a shipping notification from the manufacturer, corresponding to the goods-received note.

A physical audit may also be conducted in association with publication of the certified catalog of items, which may be a pre-requisite for such publication. The physical audit verifies the physical presence of the items and may also be used to obtain information useful for verifying the chain of custody. It may also involve highlighting information that could be used to identify the seller, for subsequent removal upon shipment through platform-initiated purchases.

Still further, the presentation of certified items may implement dynamically updated search results corresponding to queries regarding published inventory items without requiring separate page loads.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
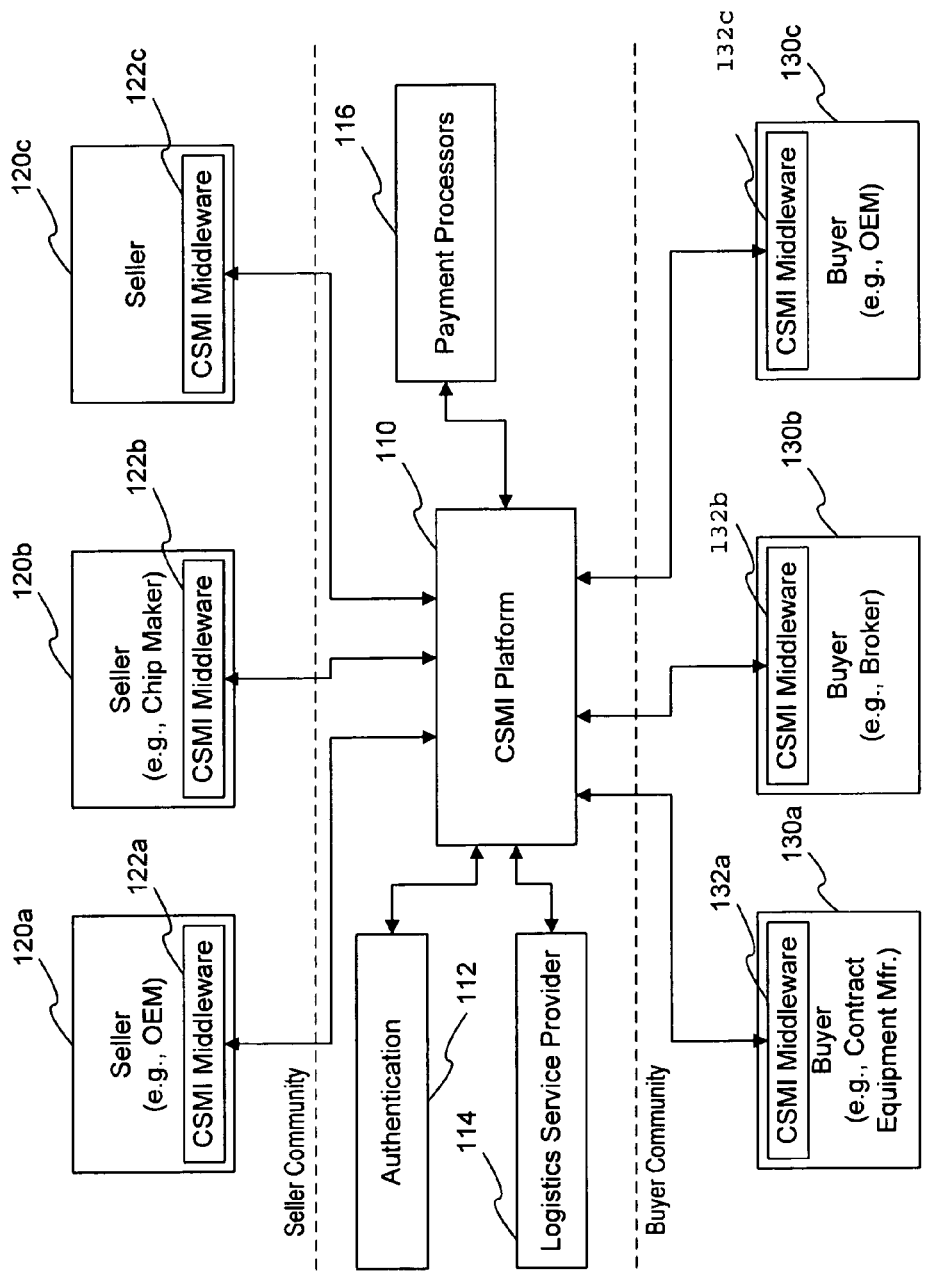
FIG. 1 is a block diagram illustrating an example of a system in which certified secondary market inventory management is provided in accordance with an embodiment of the present invention.

FIG. 1 is a block diagram illustrating an example of a system 100 in which certified secondary market inventory management is provided in accordance with an embodiment of the present invention. At the heart of the system 100 is a certified secondary market inventory management (CSMI) platform 110. The CSMI platform 110 is in one sense an authentication tool that facilitates the trade of surplus secondary market items, such as electronic components, which are traceable to their original manufacturers.

In connection with the presentation of available inventory items, the CSMI platform 110 is, for example, a clearing house for certified "pre-owned" chips that are physically authenticated (via interface to authentication provider 112), as will be described further below.

The CSMI platform 110 also interfaces with a member community, which includes sellers 120a-c and buyers 120a-c. The community membership may vary depending upon the secondary market that the CSMI platform 110 is operating in. In the example of the electronic component market, members in the community may include but are not necessarily limited to Original Equipment Manufacturers (OEMs), Contract Equipment Manufacturers (CEMs), Chip Makers (CMs) and others. Additionally, certain members may participate both as buyer and seller, such as an OEM. Other parties such as brokers would more appropriately participate only as buyers.

It is noted that references to "buyers 120a-c" and "sellers 130a-c" herein may actually be to the corresponding computer systems and functional software for performing the described activities. In that regard, the CSMI platform 110 and corresponding seller 120a-c and buyer 120a-c side functionality may be provided using any conventional computing infrastructure and corresponding foundational software. By way of example, the CSMI platform 110 may be configured for access through a network connection, whether public, private or a combination thereof, including but not limited to a connection that involves the Internet. Similarly, the CSMI platform 110 may be variously accessible to access and provide information. For example, the seller 120a-c and buyer 130a-c computing systems may use conventional operating systems and conventional browser based access to information on the CSMI platform 110. As will be described further below, software may also be provided that allows the seller 120a-c and buyer 130a-c systems to interface and interpret (if necessary) information locally available through proprietary inventory management software (e.g., SAP or Oracle), as well as the CSMI platform 110.

According to one embodiment, both the buyer and seller sides are equipped with CSMI Middleware 122a-c, 132a-c to carry out certain functionality. The CSMI Middleware 122a-c, 132a-c plays an important role in countering some of the business problems introduced above. For example, the CSMI Middleware 122a-c, 132a-c preferably resides within the firewall of the member community (i.e., independently for respective members). This provides an additional layer of safety and security when interfacing with the CSMI platform 110. For example, the CSMI Middleware 122a-c can act as a member-specific agent that assists or wholly participates in de-sensitizing enterprise data as well as ensuring that the sensitized version of the enterprise data remains entirely confidential. The CSMI Middleware 122a-c, 132a-c also acts as an automated trading channel between the buyers and sellers in the secondary market.

Although the implementation of middleware is believed to be advantageous for the noted reasons, and therefore preferred, it is noted that the present invention is not necessarily limited to embodiments that require or even implement a middleware solution. That is, for example, the functionality of inventory presentation and corresponding interfacing to convey excess inventory, access available inventory and fulfill transactions could be performed using systems that implement a client-side (buyer, seller) that merely uses generic browsing (or similar) capability, with the functionality described herein being entirely provided and performed on the server side (i.e., by the CSMI platform). Alternatively, the bulk of the functionality may be entirely present on the client-side, with appropriate data merely being uploaded to the CSMI platform to accommodate the presentation of information to other members. These and other possible solutions will be readily recognized by the ordinarily skilled artisan once instructed according to embodiments of the present invention.

With the CMSI platform 110, sellers 120a-c are accommodated access to a vehicle that allows the showcasing of surplus components to potentially interested buyers 1 30a-c as soon as the components are identified as excess. This gives an opportunity for the sellers 120a-c to sell their components without any further delays (subject to staging to further authentication and data enrichment as described further below).

In conjunction with this, the CSMI platform 10 provides or interfaces with an authentication provider 112 as described. This may be a physically-implemented process that distinguishes and grades components depending upon where the seller procured the components from. This helps provides a level of authenticity certification that is not believed to be available in even a limited sense with any existing systems or practices for obtaining parts in a secondary market. This certification allows buyers to proceed with an assurance that the purchased components are genuine. At the same time sellers are much more likely to receive a fair market price for a component if it is certified. In one embodiment, the CSMI Middleware 122a-c accommodates component pricing by interfacing with appropriate corresponding systems and physical processes to ensure certification, and to access prior sales data for the relevant components and corresponding grade. By linking items to original shipping and receiving records, the CSMI Middleware 122a-c uses historical information to authenticate the surplus components. Using these records, chain of custody from the original manufacturer to the current owner is evidenced.

Preferably, the CSMI Middleware 122a-c allows the seller to analyze the grading and pricing information, and seeks authorization of the seller before the components get published to interested buyers on the CSMI Platform 110. As the platform is used, this becomes a continuous process which helps sellers move surplus items without the involvement of middlemen. And, as noted, the CSMI Middleware 122a-c protects the sensitive data of the seller from exposure outside of the seller's firewall, including other sellers, buyers, or even the CSMI Platform 110. This allows the seller to protect sensitive information such as specific pricing, specific suppliers or vendors for particular items, etc.

The CSMI Middleware 132a-c also helps to reduce the procurement time for buyer members. This may be in the form of an automated process that pulls the components shortage forecast list from the buyer's ERP system. In conjunction with this, the CSMI Middleware 132a-c is in communication with the CSMI Platform 110 that maintains the inventory or surplus components from the entire seller community. This allows a comparative match between the shortages and the corresponding available product list from the CSMI Platform 110, with the result being directly publishable to the buyer (on the client-side, behind the fire wall) even before the shortage occurs, with the opportunity to buy the available secondary market components to alleviate the looming shortage. In addition to being convenient and automated through access to the shortage information, the CSMI Platform 110 also reduces the time required to analyze the existing fragmented secondary market and removes additional trading channel participants from the procurement path, in that the parts are purchased directly from the seller (yet in an anonymous fashion to all parties).

Similarly, the CSMI Middleware 122a-c retrieves surplus inventory from the seller's ERP (e.g., by a push or pull technique). With regard to this, the CSMI Middleware 122a-c may automatically certify components by authenticating them against ERP transactional data, with a cross-reference to an approved vendor list if desired. Still further, the CSMI Middleware 122a-c may differentiate the surplus components into grades. As described, the CSMI Middleware 122a-c may price the surplus components. This may be done by taking the transactional price details and calculating a list price to be published on the CSMI Platform 110. For example, the list price might be a representative average based upon past sales data for that type of item. If desired a transaction fee may be included as well. Of course, the CSMI Middleware 122a-c may give sellers authority for the final approval of uploading the inventory into the CSMI Platform 110, such as through an inventory list that may be viewed, queried and approved (on a per-item, per-type, or any basis). Upon approval, the CSMI Platform 110 updates its inventory listing accordingly (of course, actual publication may be done following staging conditions such as physical inspection and data enrichment, as desired).

In one embodiment, once the CSMI Platform 110 stages new inventory items, it authenticates the items as certified for sale prior to actually listing the components as being available. This may be performed through authentication 112 wherein CSMI customer service representatives physically analyze the inventory list at seller's warehouse. Of course, these representatives may be third party providers. Two classes of providers are audit companies, such as SGS and Bureau Veritas, and third party logistics providers, such as BAX Global, Exel Logistics, YCH, and others.

During the audit, the items (e.g., electronic components) are physically verified, counted, packed and photographed. It should be noted that this step may apply to numerous items that will remain contained in their original packaging. For example a reel may contain thousands of resistors. There, the reel is physically verified and photographed, not necessarily each individual resistor. There, the "item" is the reel of transistors. Also, the term "packed" does not necessarily entail full packing for shipping purposes. It may merely be placement of the items in a plastic bag or the like for secure storage and segregation from other items. Again, the packing may apply to numerous items together (e.g., a reel of resistors). The onsite auditors will capture additional details about the component and send it back to the authentication interface 112. Here data cleansing and standardization may be performed to further integration with the CSMI Platform 110 and corresponding presentation in the catalog of available components. This process ensures that the components ultimately on display at the platform are valued reasonably and qualitatively.

In one embodiment, the storeroom audit pursuant to certification has three phases: pre-audit, tagging & bagging, and image processing and posting. In the pre-audit phase, the seller has indicated a list of items to publish as described above. This information is accessed by the CSMI Platform 110 and communicated to the authentication provider 112. In conjunction with this, the list may be sanitized as necessary and relevant information such as the date by which certification must be provided is ascertained by the authentication provider 112. In the tagging & bagging phase and a barcode SKU label unique to that item is affixed to each packaged item. Additionally, any information on the original packaging that could be traced back to the seller is highlighted. This will allow the (e.g., third party) logistics provider to remove or obscure any such information during subsequent processes (i.e., when the items are shipped). Additionally, each item is digitally photographed, bagged and returned to the shelf. Finally, in the image processing and posting phase, the authentication provider 112 uploads images to an FTP site (either hosted by the authentication provider or directly into the control of the CSMI Platform 110). Other information such as warehouse location may also be collected and uploaded at this time. All of the data is associated to the unique SKU described above. In conjunction with this, the data corresponding to the uploaded images is staged for eventual posting to the catalog of available inventory on the CSMI Platform 110.

Finally, the CSMI Platform 110 interacts with a logistics service provider 114 and payment processors 116 to fulfill the transaction, which will occur when a buyer member reviews the available catalog of items, selects one or more for purchase (typically large lots with electronics components), and confirms a purchase through the CSMI Platform 110 interface.

The logistics server provider 114 provides logistical support in terms of cross-docking the items and then shipping them. The cross-docking aspect gets the items ready for anonymous shipment. This involves repackaging items to remove any indicia of the seller identity, which is assisted by the highlighting of such information as described above, and may also involve other requirements for getting the items ready for shipment (e.g., shipper packaging requirements). Once the items are cross-docked, they are provided to the shipper (e.g., by pick-up or at a drop-off location), and shipped without identification of the seller to retain anonymity. The cross-docking and shipping roles may be performed by a single entity that performs both cross-docking and shipping services, or by separate entities. Additionally, a seller 120a-c may participate in the cross-docking role, such as by making the items available and possibly other activities. The addressing to the buyer would be performed by another party to ensure anonymity.

Procedurally, the CSMI Platform 110 initially informs the seller that particular items that have been published in the catalog have been sold. This communication may be an e-mail sent to a designated contact person at the seller 120a-c, or a communication that appears through the interface provided by the CSMI Middleware 122a-c. This communications identification the sold item(s) and provides instructions to further preparation for shipment. These instructions may indicate the third party logistics provider that will cross-dock the items, or may simply instruct the seller in that regard. At the same time, the CMSI Platform 110 also sends the shipper a work order indicating the items to be picked up and the address of the buyer. Throughout the fulfillment process, the unique SKU barcode tagged to the items are used to identify them, track shipment, etc. The seller is not indicated in the shipment to the buyer. Instead, the address of the CSMI Platform 110 service provider (e.g., Verical, Inc.) may, for example, be indicated as the return address of the shipping party.

Payment may be variously accommodated. Generally, one payment is made from the buyer to the CSMI Platform service provider, and another payment is made from the CSMI Platform 110 service provider to the seller, with the unique SKU again being used to track the transaction.

The CSMI Platform 110 service provider may variously associate fees with the transaction. In one example, a service transaction fee to be paid by the buyer is associated with items listed in the catalog of available items. This may be a percentage amount that is added to the list price, which may vary depending upon whom the buyer is. A shipping and/or handling fee may also be charged to the buyer. This may be an automatically calculated fee based upon the amount of the order and the predicted weight of the order. Alternatively, at least for the shipping fee, the buyer may directly pay the shipper for the actual charges for the shipping services, such as through provision of their shipper identification number. Actual payment to the CSMI Platform 110 service provider may be made by credit card. Alternatively, cash payment may be made on pre-determined terms and conditions (e.g., net due 15 days after shipment or delivery).

Transaction fees may also be accorded to the seller. For example, the CSMI Platform 110 service provider may pay the seller a percentage of the list price (e.g., 85%). This percentage may alter depending upon factors such as seller identity (e.g., large volume sellers may merit a better deal), and items sold (e.g., some items have markets that may mandate a smaller margin). Payment may also be variously made to the seller (e.g., cash) and may similarly be made on predetermined terms and conditions (e.g., 30 days).

Figure 2:
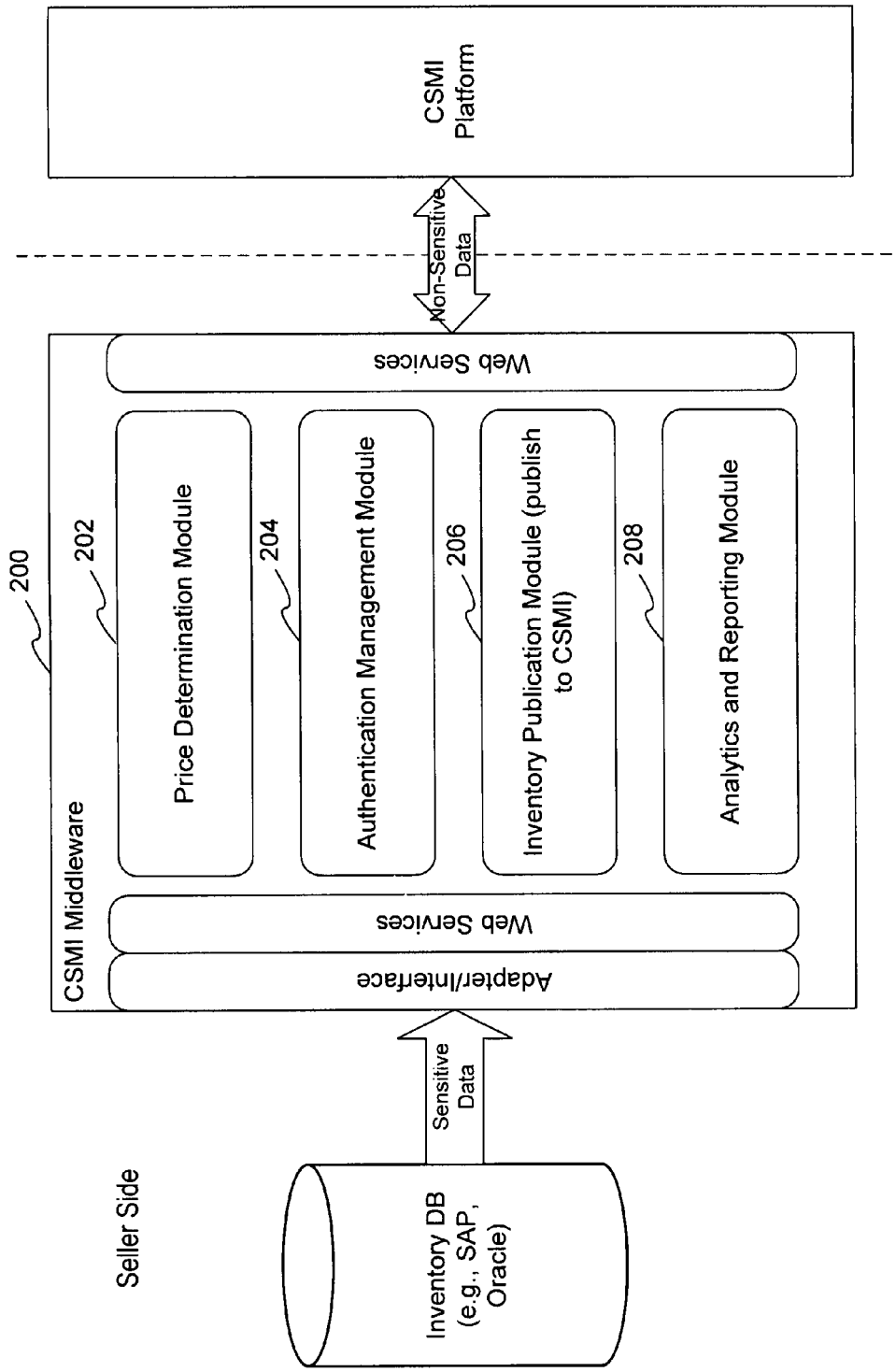
FIG. 2 is a block diagram illustrating an example of seller-side middleware and corresponding certified secondary market inventory management in accordance with an embodiment of the present invention.
Figure 3:
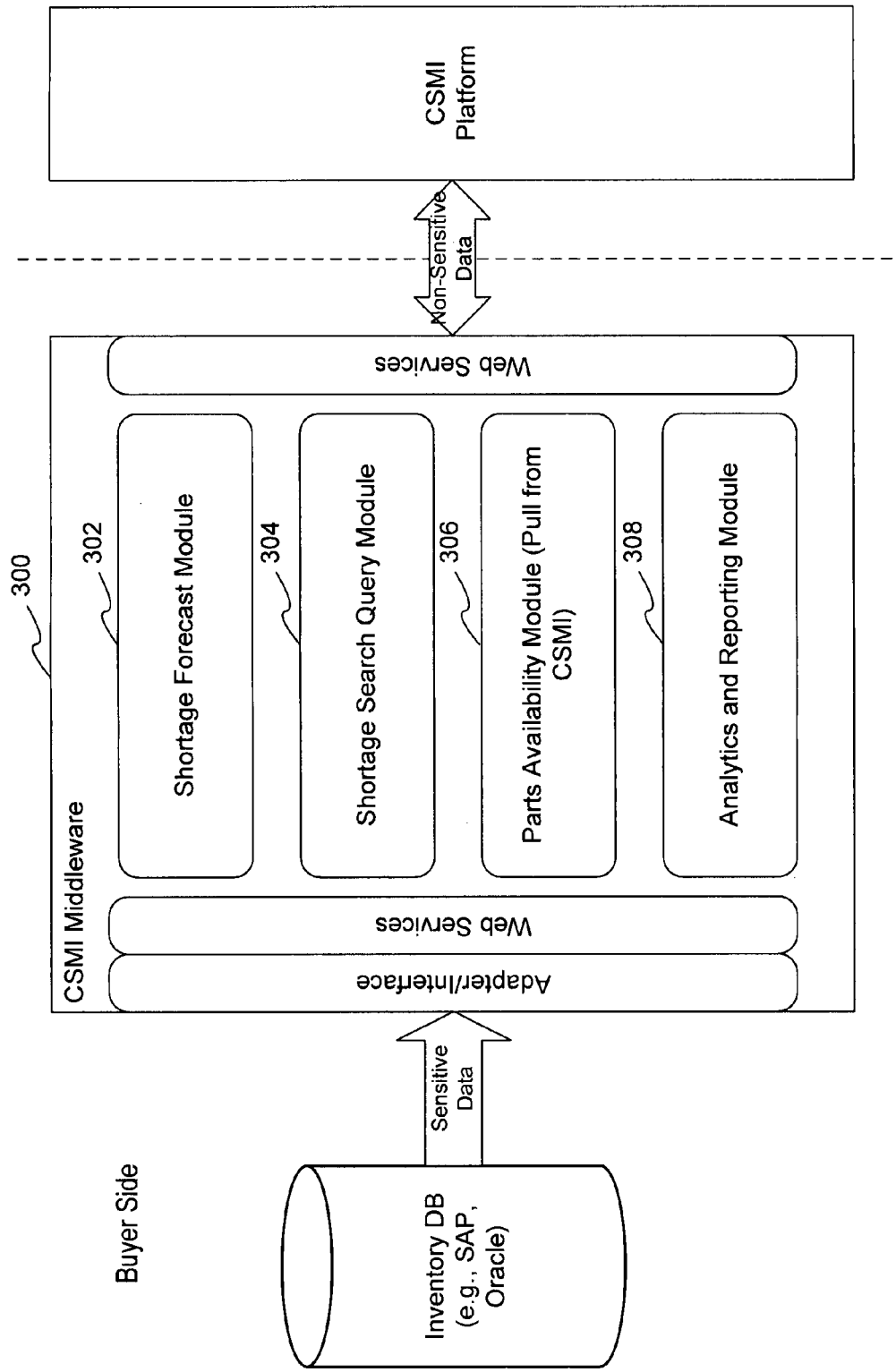
FIG. 3 is a block diagram illustrating an example of buyer-side middleware and corresponding certified secondary market inventory management in accordance with an embodiment of the present invention.

FIG. 2 is a block diagram illustrating an example of seller side middleware and corresponding certified secondary market inventory management, and FIG. 3 is a block diagram illustrating an example of buyer side middleware and corresponding certified secondary market inventory management. It should be understood that members may be sellers, buyers, or (more typically) both buyer and seller dependent upon circumstances. Typically, the CSMI Middleware will provide both the buyer and seller functionality when, e.g., it is downloaded or otherwise provided for implementation in the computer systems of CSMI Platform members, meaning that the CSMI Middleware would include the functionality of both FIG. 2 and FIG. 3.

Referring first to FIG. 2, the seller-side CSMI Middleware 200 is preferably provided as software, executing on any conventional computing platform. (In one embodiment, the CSMI Middleware 122a-c, 132a-c is a dashboard that is provided from with the ERP environment of the seller (or buyer). Although one modular breakdown of the seller-side CSMI Middleware 200 is described, it should also be understood that the described functionality may be performed using greater, fewer, or differently named modules.

The seller-side CSMI Middleware 200 comprises a price determination module 202, and authentication management module 204, an inventory publication module 206, and an analytics and reporting module 208. The price determination module 202 provides interfaces and corresponding information that allows the seller to assess and configure the listing price for items to be published. As described, the list price for an item is a combination of the base price plus a transaction fee, with the transaction fee varying depending upon factors such as component class (e.g., passive component=10%, memory=3%, etc.), transaction volume, and service level agreement for the seller (e.g., huge customer may dictate better terms). A default price may appear but the seller may set the price as desired. The seller is free to peruse the catalog to review the listing price for similar items as well. The seller can also review and set breakpoints (i.e., the volume(s) at which discounts are provided). The CSMI Platform 110 may provide uniform breakpoints for standardization of buyer experience, and/or the seller may be free to set their own breakpoints.

The authentication management module 204 is preferably a database that associates generic security levels with certain conditions. For example, the generic security levels may be "bronze", "silver", "gold" and "platinum", and the conditions may be an identification of vendor and the level of chain of custody evidence that is available for the items. This is only an example, and various generic security level designations may be used. For example, one through five stars may designate the levels, with five star security being the highest. Other schemes involving colors, numbers, names, etc. may of course be provided. The identification of the vendor is not communicated to the platform, but is instead correlated to the generic security level, and the generic security level is communicated to the platform in association with the items to be published.

For example, if it is known that the vendor is the original manufacturer of the item (e.g., Intel for certain computer chips), then the generic security level is automatically set as a level such as the gold level, but a sister level company or distributor would be accorded silver level status. The information about vendor identity may be provided to the Middleware through the seller's ERP system, and the Middleware may use its database to correlate levels to seller identity. A given seller may also be of a certain level for some particular items and another level for other particular items. These and other criteria are provided in the database. The evidenced chain of custody also preferably factors in the determination of the security level. For example, where the evidenced chain of custody includes an identification of the manufacturer, a goods-received note corresponding to shipment of the item from the manufacturer to the current owner, and a manufacturer shipping notification corresponding to the goods-received note, then the item may be accorded platinum status.

The inventory publication module 206 includes interfaces that accommodate a review of inventory to be published as well as final seller authorization to publish. Additionally, the inventory publication module 206 may communicate the status of inspection and verification for items staged for publication, and corresponding requests for action and information in that regard.

The analytics and reporting module 208 allows a review of price ranges for identical, equivalent or similar parts to those being considered for publication, as well as the ability to review the catalog and obtain corresponding information based upon part number queries or categorical searching. With regard to categorical searching, the user may be provided with a navigable listing of categories and subcategories. With regard to the information that is made available in connection with a possible publication, the CSMI Platform 110 service provider may assign fees corresponding to the amount of information that is provided. For example, a base functionality may allow review of identical part number pricing, with higher level functionality providing more extensive and flexible price comparison information.

With reference to FIG. 3, the buyer-side CSMI Middleware 300 is also preferably provided as software executable on any conventional computing platform. And, similarly, although one modular breakdown of the middleware is described, the described functionality may be performed using greater, fewer, or differently named modules.

The buyer-side CSMI Middleware 300 comprises a shortage forecast module 302, a shortage search request module 304, a parts availability module 306 and an analytics and reporting module 308.

The shortage forecast module 302 provides interfaces through which information about a forecast shortage is conveyed to the user. This may be performed through communication with the materials resource planning (MRP) component of the ERP system. That MRP component helps companies to calculate the amount of parts that are used in satisfying existing orders, how many will be needed to satisfy expected future orders, etc. The MRP component thus generates a shortage list that is ported to the shortage forecast module 302. The shortage forecast module 302 may also include interfaces that allow the user to manually update the default shortage listing, which may be done where the user is familiar with conditions that are not yet available or reflected in the ERP system.

The shortage search request module 304 communicates with the shortage forecast module 302 to receive the default or customized shortage list and accommodates automatic generation of search queries for corresponding available items from the published catalog. The shortage search request module 304 may include or refer to a database that associates identical, equivalent or similar items. Communication of search information is preferably made through secure communications (e.g., SSL or greater level of encryption) and is not made available to the public.

Corresponding to such searches, the parts availability module 306 provides results corresponding to search requests. If desired, rules can be set up to undertake automatic procurement if desired as well. The analytics and reporting module 308 functionality is described with reference to the seller-side functionality above, and similarly provides interfaces and tools through which available parts may be reviewed. Interfaces useful for navigating among available parts provided by the various modules, particularly the analytics and reporting module are described further with reference to FIG. 5.

Figure 4:
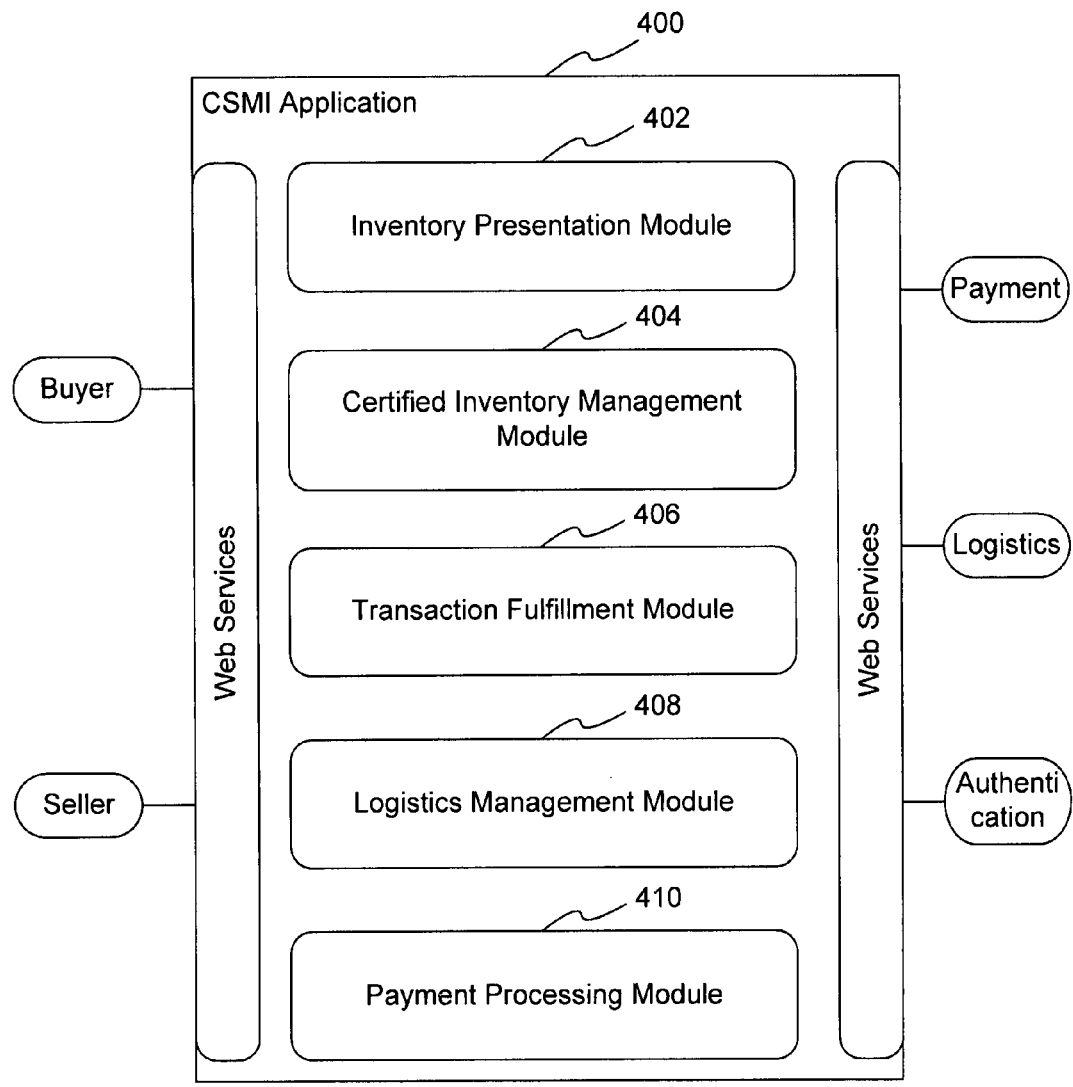
FIG. 4 is a block diagram illustrating an example of a certified secondary market inventory management application in more detail in accordance with an embodiment of the present invention.

FIG. 4 is a block diagram illustrating an example of the CSMI Platform 400, which also is preferably software-based, but which resides on a server accessible by the membership community to accommodate the publication and review of inventory items as well as corresponding transactions and fulfillment thereof. The interface with the buyer, seller, payment processor, logistics provider, and authentication provider are respectively illustrated in the figure. These roles have been previously described but are illustrated for context. The CSMI Platform 410 also includes web services, which are an example of the facilities used to interface with the various constituents, and which are well known and need not be described in detail herein. The corresponding buyer and seller-side CSMI Middleware also illustrates the same.

Again, the modular breakdown of the CSMI Platform 400 is provided by way of example, with the understanding that the described functionality may be provided with fewer, greater or differently named modules. The CSMI Platform 400 comprises an inventory presentation module 402, a certified inventory management module 404, a transaction fulfillment module 406, a logistics management module 408, and a payment processing module 410.

The inventory presentation module 402 accesses the global listing of parts that are made available by the community of sellers. As described, the unique SKU is used to identify and track items, and this information is stored in association with each item listed for publication. When an item is uploaded by a seller for requested publication, it is staged for publication. This may entail creation of a database entry for that item with flags indicating the status of physical authentication and any related staging issues. Once the physical authentication events have taken place, any necessary confirmatory messages to the seller can be generated and the flag status can be updated so the published items can appear in relation to search queries.

The inventory presentation module 402 may also maintain information and/or communicate with external information providers to perform the data enrichment function. For example, for a given type of component, the inventory presentation module 402 may access supplemental information including detailed part specifications. This allows a rich presentation of features without requirement the seller to enter such information, and without requiring repeated uploading of data unnecessarily.

The inventory presentation module 404 also includes facilities for generating responses to search queries, whether submitted directly as a search query or by automatic comparison to shortage list information.

The certified inventory management module 404 provides communications that further publication of only certified inventory. This entails automatically generated e-mails or other communications that further and confirm the completion of the tagging & bagging phase wherein the barcode SKU label is affixed to each packaged item and seller identification information is highlighted. In conjunction with this, the certified inventory management module 404 receives uploaded images and any other desired information such as warehouse location regarding the certified items. Once these processes are completed, the inventory is published in the catalog as noted.

It is also noted that verification of chain of custody to the manufacturer (directly or indirectly) may also be taken in conjunction with item publication in the catalog. This verification may occur before publication (i.e., as a pre-requisite), after publication, or in phases before and after publication of the item. Also, the item may be published having an associated security level (e.g., two stars, bronze) but may be upgraded following publication (e.g., to platinum) once chain of custody is further verified.

In one embodiment, chain of custody verification may occur based upon information accessed by the CSMI Middleware from either or both the local ERP system and the CSMI Platform. For example, the seller-side CSMI Middleware may access the ERP system to access information such as a goods-received note for the seller. The CSMI Platform may also (securely) provide information to the CSMI Middleware that is obtained from the uploaded imagery and data from the audit corresponding to an item. Still further the CSMI Middleware may obtain information such as shipping notification information from a manufacturer. The CSMI Middleware correlates and reconciles this evidence to verify chain of custody pursuant to determining a security level that is then uploaded to the CSMI Platform.

In some circumstances verifying chain of custody may implement rules, such as a rule that concludes a particular security level to be applicable regardless of the correlation to typical evidence. For example, if a given seller has previously published items that merited a security level on several occasions, and the given seller is requesting publication of the same type of items, the same security level that applied in past publications of the items of that type may be automatically accorded to the current items.

Finally, it is noted that the verified chain of custody to the manufacturer need not go all the way to the actual manufacturer, but rather to another entity such as a distributor for the manufacturer. This may also factor into the determination of the security level.

The transaction fulfillment module 406 communicates with the inventory presentation module 404 and receives confirmed purchase indications from users. It may provide a shopping cart type functionality as well, wherein users may indicate desired purchases and retain them for subsequent confirmation. Once a purchase is confirmed, a transaction identifier is maintained in association with the corresponding list of unique SKU numbers for the ordered items. The ordered items are removed (or may have already been removed pending confirmation of the order) from the catalog.

The logistics management module 408 communicates with necessary parties to engage with cross-docking and shipping. As noted, this may be automatically generated work orders that go to either separate entities or to a single entity that performs both of these functions. These communications may be made via e-mail or may be made through communications tailored to provide automated instructions to third party logistics providers. Provided information may include the list of all items to be cross-docked, work instructions, pending orders, items that need to be picked up, information that needs to be obscured, instructions on how to fill out address label to ship to buyer, etc. Additionally information useful for accommodating export, such as managing country of origin information and related rules and procedures may be provided.

The logistics management module 408 may also receive information about the status of cross-docking and shipment, or may channel the information provided by the computer systems of such providers for access through the corresponding middleware. This allows features such as shipment tracking through the common interface.

Finally, the payment processing module 410 accommodates and manages payments to be received from the buyer and made to the seller, with corresponding communications with third parties such as credit processing agencies as desired. The details of payment and corresponding transaction fees are described above.

It is also noted that other functions may be provided such as administrative functions that allow customer service representatives of the CMSI Platform service provider to access information, expedite logistics for customers, etc.

Figure 5:
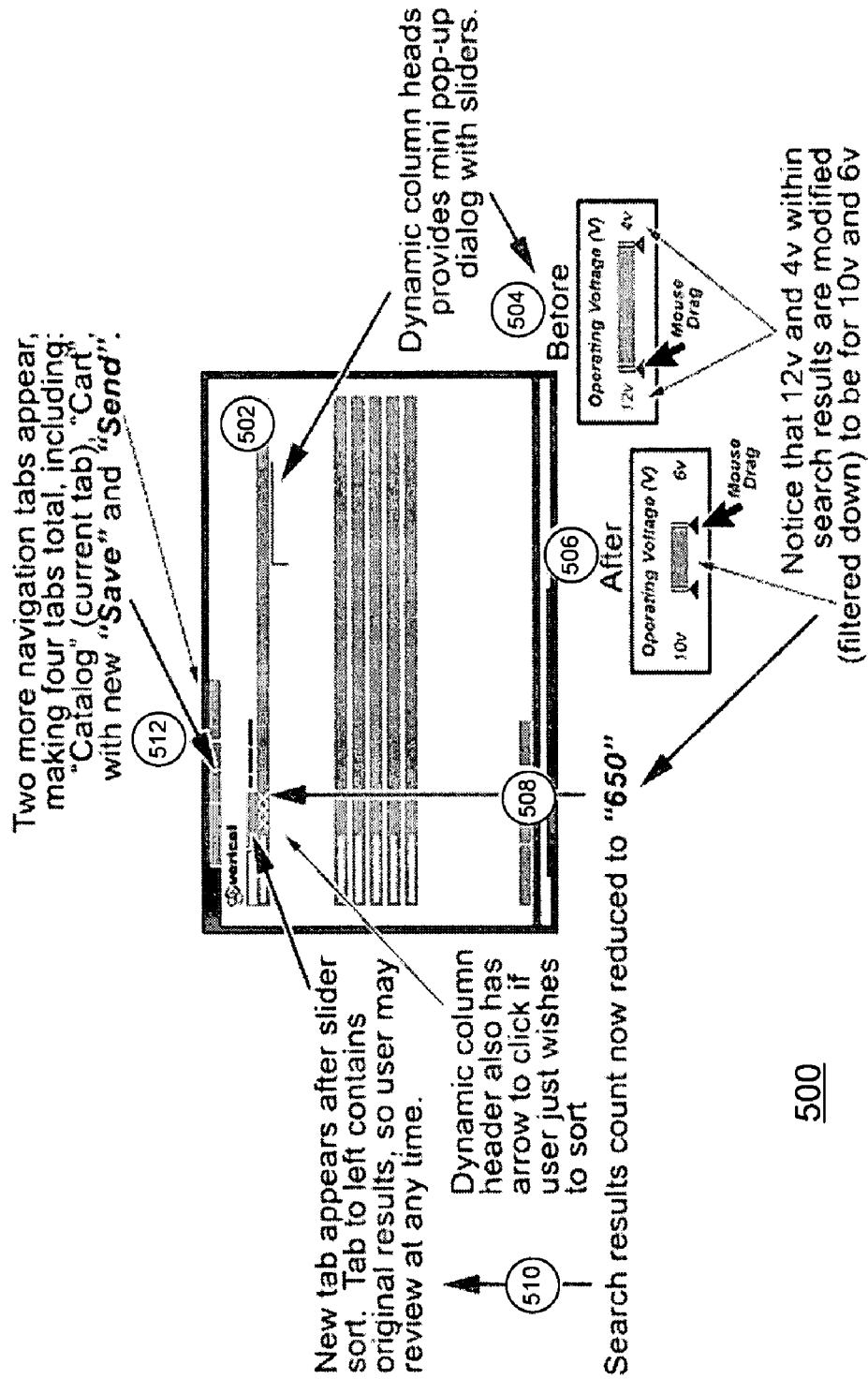
FIG. 5 is a display diagram illustrating an example of an interface for presenting inventory items in accordance with an embodiment of the present invention.

FIG. 5 is a display diagram illustrating an example of a user interface 500 for presenting inventory items in accordance with an embodiment of the present invention, such as provided on the CSMI Platform. The CSMI Platform may use various presentation layer components in order to carry out the display of available inventory, and to allow the user to easily navigate among available items and to refine lists of displayed item search results. The presentation layer ports to the database of inventory to populate such displayed lists, and also tracks shown and selected items to interface with remaining CSMI Platform modules to carry out purchases, update the catalog (database), etc.

In one embodiment, the user interface 500 is provides the user with a real-time on-screen filtering and subsequent reduction of line items to a screen composed of higher quality results. The main layout may be divided into a central "workbench" area that presents filtering dialogs, and a re-situated search entry box that collapses and expands dynamically to allow the user to expand or reduce the scope of listed entries according to various field parameters.

According to this aspect, the present invention allows dynamic search results corresponding to the review of published inventory items, in lieu of traditional iterative generation of new pages based upon search queries.

This interface avoids click-through and screen wait/refreshing cycles where repeated search querying/results are foreseen due to the large number of entries. The interface is preferably a rich Internet application based interface that provides a single page UI with collapsible, comparative areas of data, with key identifying fields presented in columnar format. The columns may be sorted (with interchanging directional arrows). Access to on-screen filtering is had through a comprehensive dialog for all key fields as well as a local field filter available within the header of each column. This local filtering can be accessed by clicking on a hyperlinked column header, located next to the column sorting arrow.

Preferably, the page navigation provides space for key identifying fields such as MPN (manufacturer's part number) and similar basic identification fields. Within the header of the key identifier is the MPN used for the search as well as the number of associated search result items. In addition to number-based searching, the interface accommodates categorical searching (major categories and corresponding sub-categories) such as through menu based selection.

The remainder of the page is divided into closed accordion views, each titled on the accordion folds to include Manufacturer, Delivery Info, Date Codes, RoHS, etc. (key information field categories could change for each user with a buyer's preferences different from those of a designer, or an engineer.)

Depending on the size of the data table, accordion folds may also be placed to segregate and provide comparative viewing of data that would otherwise be difficult to view and analyze.

With reference to FIG. 5, clicking on the title within any column header will provide a fully interactive slide filter, which can be referred to as a "slider". Once the user clicks on a column header (502) he or she is presented with a mini-dialog that is comprised of the column header with an interactive slider directly beneath. To the left of the slider is the high data mark (both dynamically obtained from the current results data table). The user then applies the mouse pointer to either or both of the two slider handles and drags them in a direction that will lessen the range of the results. By pulling both handles closer to gather, the user has eliminated the highs and low to display only the middle results.

For example, as each slider is dragged the corresponding range numbers change and respond as the handle is dragged (full numbers unless specified otherwise) and once complete the user can visually see exactly what range will filter to reduce (or expand) the current on screen data set. As indicated, a "before" range may comprise parts with an operating range between 12V and 4V (504), and through manipulation of the sliders the user may prompt an "after" range that will comprise parts with an operating range between 10V and 6V (506), thus narrowing the search and corresponding number of items to be displayed.

In operation, once the mouse moves off the dialog, the dialog disappears but can be presented again at any time by clicking the column header. Once the slider dialog disappears, the state of the on-screen data changes and becomes a filtered version of the initial data search results. In conjunction with presentation of the data search results the number of displayed items may reduce and that number may be displayed for easy review by the user (e.g., it may reduce to "650" whereas a previous listing may have had many times that number) (508).

Additionally, the completion of a change in the displayed listing prompts display of a new active tab corresponding to the current listing. As new listings are requested and displayed, additional new tabs sequentially appear along a header row corresponding to each instance (510). Inactive tab(s) to the left of the current tab correspond to prior search results that the user may return to at any time (e.g., if they decide to discard filters and begin again).

Additional tabs may also be provided to assist the user, including "Catalog", "Cart", "Save" and "Send" (512). The Catalog tab indicates the "catalog" or zone in which the user actively resides during a component browsing exercise, and the Cart tab accommodates entry of purchase selections and corresponding well known functionality. Where the user has put some time and effort into filtering results, they may wish to use the Save tab to save them (because they want to save the items but are not ready to purchase), or use the Send tab to forward the results to another individual for approval before purchase is made.

For results that may require extensive tweaking, the user has the option of employing an advanced filter dialogue. This may be a pop-up dialog that presents a collection of either all (or a specified selection) of column headers with sliders for engaging in further refinement of listed results. Once enacted, the massaged range of resulting line items will likely be fewer in number and far closer in characteristics to targeted user requirements. On closing the advanced filter dialog the page again provides "Save" and "Send" options to accompany the existing "Cart" navigation link.

Magnifier SKUs and other product identification numbers, IDs with unique number appendages, as well as things like voltage rates or date abbreviations, all require close examination, especially where quantity purchases are to be made. Because of this (and the sometimes overwhelming number of results present within a user's viewing area) the interactive interface is also equipped with a content magnifier. The magnifier enables the user to mouse over any cell and have just that cell's content enlarged in an area above and to right/left for closer examination.

In this embodiment, once save is clicked by the user processing from the presentation layer may return to a database and corresponding display mode. The user may at any time return to saved searches and the corresponding functionality as described above. The saved searches may hold a number of searches (e.g., 15). A login dashboard is available for the user to peruse and manage "My Searches," including deleting and related management of the searches.

The user can also send searches to others using e-mail. Often times a person performing a search may lack the authorization or technical ability to decide on a final purchase. In these instances an email is generated to include a link to the saved search. Once the email is opened by the recipient (e.g., a senior purchasing agent or engineer) and after they click on the descriptive hyperlink they are immediately transported to the same interface corresponding to the save. If it is the first time they are in this portion of the application, they may be provided with a default buyer view or some alternative view with modification and customization of course being available. Notably, the full contents of the search results or "Cart" are not included in the email. Instead, an email generated within the presentation layer forwards a hyperlink to the corresponding saved search results. This keeps the contents of the catalog search results available for private viewing, while also inhibiting potential competitors from accessing the same. This feature also enables expansion of the user base. Control may be made over distribution of the save by limiting viable recipients according to e-mail address. Additionally, there may be temporary access rights or other restrictions so as not to leave lingering access rights in this mode of operation.

Figure 6A:
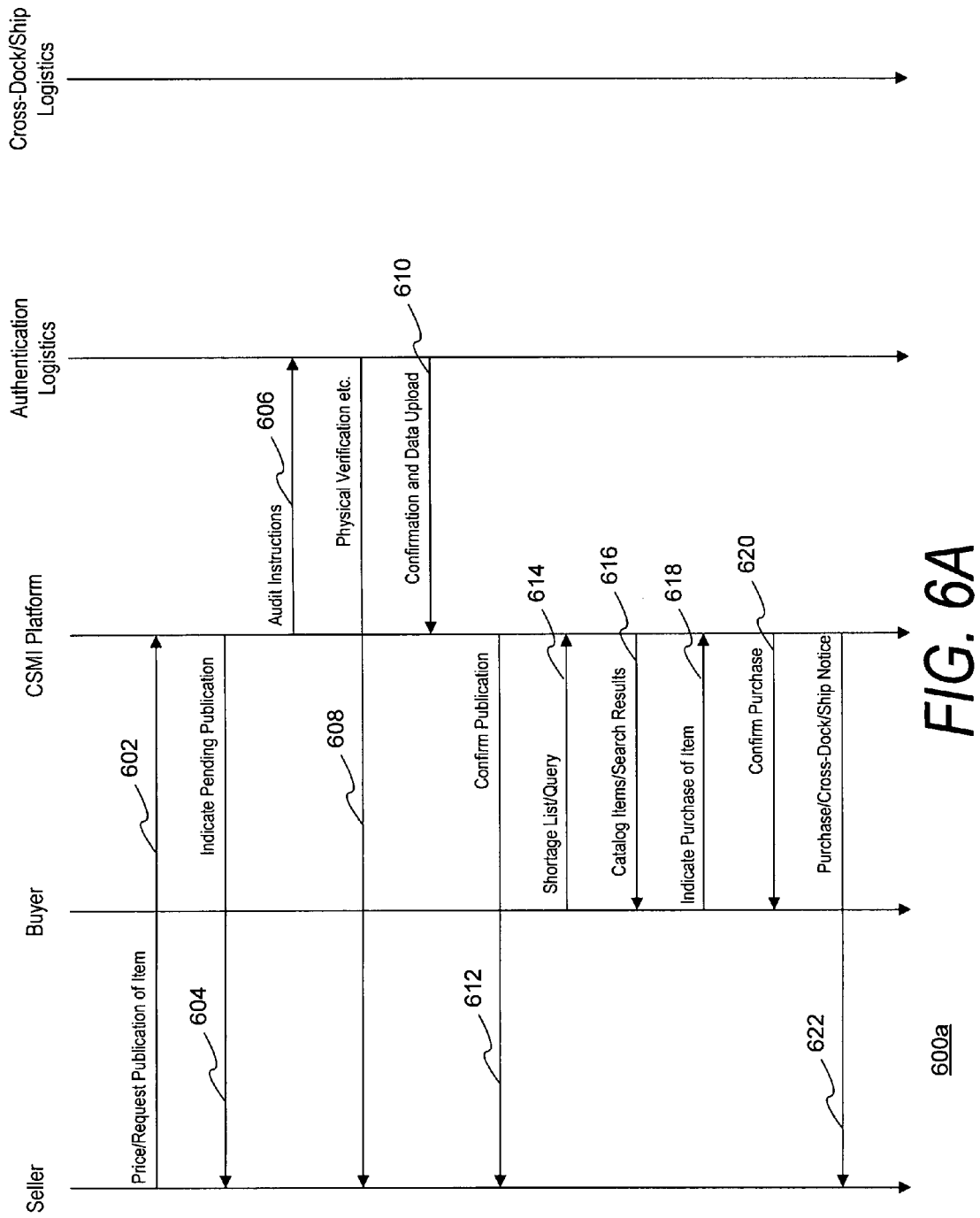
FIGS. 6A-B are event diagrams illustrating an example of a process for providing certified secondary market inventory items in accordance with an embodiment of the present invention.
Figure 6B:
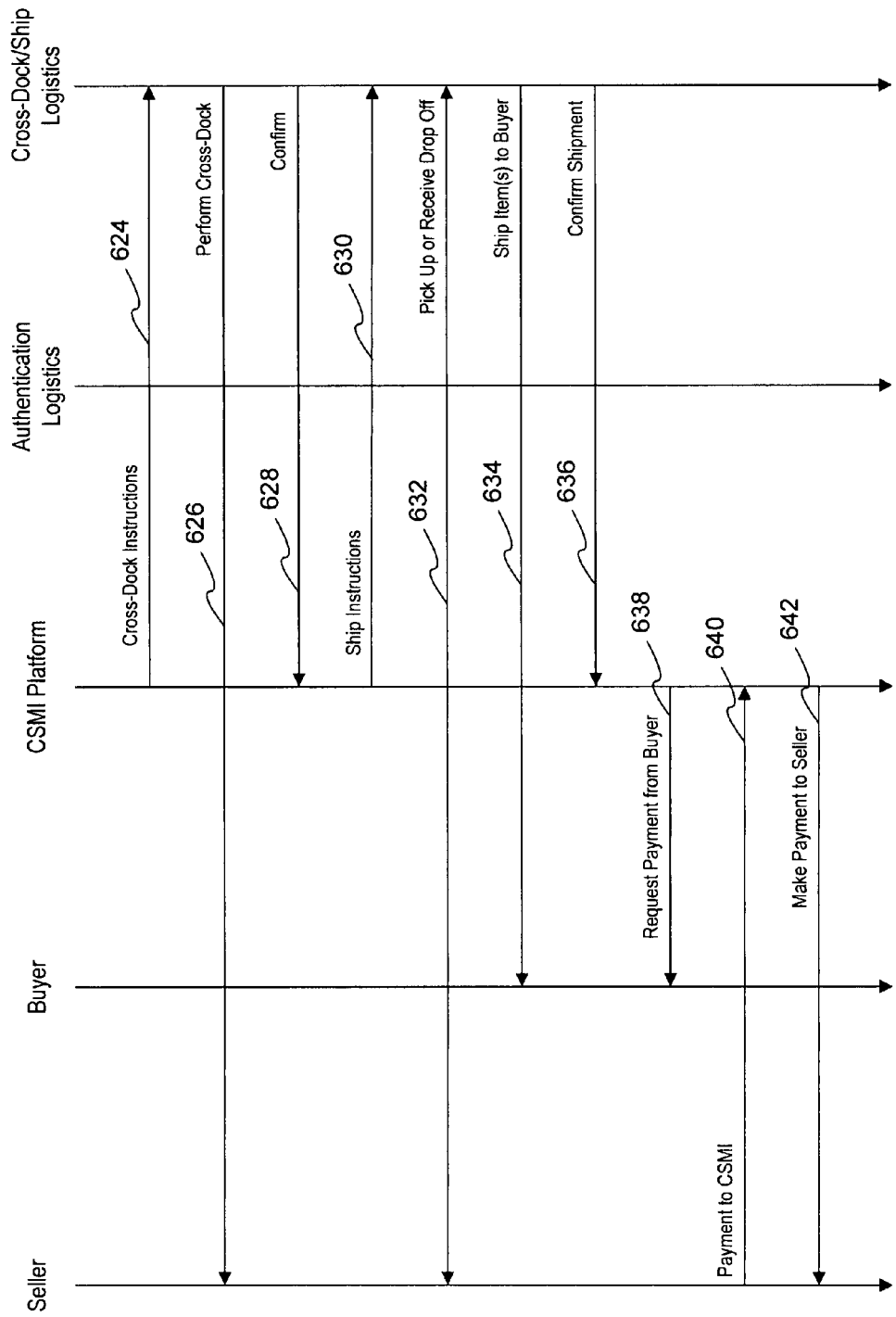

FIGS. 6A-B are event diagrams illustrating an example of processes 600*a-b* for providing certified secondary market inventory items in accordance with an embodiment of the present invention.

Referring first to FIG. 6A the process 600*a* is illustrates seller, buyer, CSMI, authentication logistics and cross-dock shipping logistics participants. The process 600*a* initially references a request 602 for publication of an item initiated by Seller to the CSMI platform. This may follow various determinations by Seller related to pricing, which may occur behind the Seller firewall through the use of middleware or through independent analysis of the desired price, such as by reviewing the catalog of available items on the CSMI platform.

Publication is not necessarily immediate, as physical inspection and related staging activities should preferably take place prior to making the item available through the CSMI platform. The pending status of publication may be indicated 604 to Seller, and in conjunction with that the CSMI platform may also issue audit instructions 606 to the Authentication Logistics provider, which responds accordingly and provides the physical verification 608 at the designated Seller location, which also preferably involves image capture. Following confirmation and data upload 610 entails confirmation of the audit to the CSMI platform, uploading of images, etc.

Once the audit is completed, the items can be made available for purchase on the CSMI platform. Confirmation 612 of this can be made to the Seller, such as by e-mail or an update provided through CSMI middleware as noted previously.

Buyers may engage with the CSMI platform to inquire about available catalog items (614). This may entail submission of individual queries using part numbers, searches based upon categories or field values, submission of shortage list data or the like. The CSMI platform returns 616 search results corresponding to the catalog. The user then selects items and indicates a purchase 618 of the same, such as through population of a cart and corresponding confirmation of purchase.

Following this, the CSMI platform sends 620 a notice to Seller indicating the transaction. This notice preferably includes instructions regarding cross-docking and shipment 622. In one embodiment, this may merely be an identification of the shipping and cross-docking services provider(s), with instructions being sent to appropriate Seller personnel to make them aware of such information. This allows Seller personnel to coordinate availability, make items available for either the cross-docking or shipping role or both, etc.

In conjunction with this, notice and instructions are also sent to the cross-dock/shipping logistics providers, which as described may be separate entities or a single entity. FIG. 6B illustrates such notices and instructions 624, 630 as being separate but they could of course be a single communication to a single provider. If necessary, cross-docking may also be confirmed 628 to the CSMI platform prior to issuing instructions 630 to pick up the item for shipment, particularly where the tasks are divided. In either event, the logistics provider(s) perform the tasks 626, 632 of cross-docking and picking up item(s) for shipment as previously described in detail.

The item is then shipped 634 to Buyer without revealing the identity of Seller. CSMI platform service provider may be indicated as the shipper, and cross-docking entails removal of Seller indicia as noted. Shipment may be confirmed 636 to the CSMI platform (which can be passed to Seller, not shown).

In one embodiment, once the item has been shipped (or received) Buyer is informed and payment is requested 638. For CSMI platform members, this may entail request for payment on terms (e.g., 15 days). Alternatively, the items may be purchased using a credit card. In those circumstances, Buyer will likely be charged at the time that the transaction is confirmed, prior to shipment. In either event, payment is made 640 to the CSMI platform. Transaction fees have been described previously and may be incorporated into the list price for catalog items. Finally, payment is made 642 to Seller to complete the transaction. This may also be on terms, and may also incorporate transaction fees, which will have been made known to the Seller at the time the publication request is made.

Thus embodiments of the present invention produce and provide anonymous and certified secondary market inventory management. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for presenting certified secondary market inventory, the method comprising:
   maintaining, by a computer, a certified catalog of items for sale on a secondary market, wherein the certified catalog of items includes at least one certified item available from a current owner, the certified item being associated with item identification information and having a chain of custody between the manufacturer of the certified item and the current owner;
   verifying the chain of custody between the manufacturer of the certified item and the current owner prior to presenting the certified item as available in the certified catalog of items;
   presenting, by a computer, available certified items in the certified catalog anonymously, such that the current owner of the certified item is not revealed to potential buyers; and
   fulfilling a transaction involving the certified item by accommodating shipment of the certified item to a given buyer without revealing the given buyer and the current owner to each other in association with the fulfillment of the transaction.

2. The method of claim 1, wherein the verified chain of custody includes evidence comprising a goods-received note corresponding to a shipment of the certified item from the manufacturer to the current owner.

3. The method of claim 1, wherein the evidence comprises a shipping notification from the manufacturer, corresponding to the goods received note.

4. The method of claim 3, wherein a security status is accorded to each individual certified item based upon the evidenced chain of custody.

5. The method of claim 1, wherein the item identification information includes a unique identifier that is associated with items made available in the certified listing of items.

6. The method of claim 1, wherein the item identification information includes a part identification code and manufacturer.

7. The method of claim 1, further comprising:
   receiving a payment from the buyer and sending another payment to the seller for the certified item, without revealing the identity of the buyer and the seller to each other.

8. The method of claim 1, wherein verifying the chain of custody comprises:
   prompting a physical audit of the certified item at a location of the seller, wherein the physical audit verifies the physical presence of the items and obtains information used to verify chain of custody.

9. The method of claim 1, wherein the presentation of certified items implements dynamically updated search results corresponding to queries regarding published inventory items without requiring separate page loads.

10. A system for presenting certified secondary market inventory, the system comprising:
   means for maintaining a certified catalog of items for sale on a secondary market, wherein the certified catalog of items includes at least one certified item available from a current owner, the certified item being associated with item identification information and having a chain of custody between the manufacturer of the certified item and the current owner;
   means for verifying the chain of custody between the manufacturer of the certified item and the current owner prior to presenting the certified item as available in the certified catalog of items;
   means for presenting available certified items in the certified catalog anonymously, such that the current owner of the certified item is not revealed to potential buyers; and
   means for fulfilling a transaction involving the certified item by accommodating shipment of the certified item to a given buyer without revealing the given buyer and the current owner to each other in association with the fulfillment of the transaction.

11. The system of claim 10, wherein the verified chain of custody includes evidence comprising a goods-received note corresponding to a shipment of the certified item from the manufacturer to the current owner.

12. The system of claim 10, wherein the evidence comprises a shipping notification from the manufacturer, corresponding to the goods received note.

13. The system of claim 10, further comprising:
   means for prompting a physical audit of the certified item at a location of the seller prior to presenting the certified item as available in the certified catalog of items, wherein the physical audit verifies the physical presence of the items and obtains information used to verify chain of custody.

14. The system of claim 10, wherein the presentation of certified items implements dynamically updated search results corresponding to queries regarding published inventory items without requiring separate page loads.

15. A method for selling items on a certified secondary market platform, the method comprising:
   making at least one certified item available for presentation in a certified catalog of items for sale on a secondary market as a current owner of the certified item, wherein the certified item is associated with item identification information and having a verified chain of custody between the manufacturer of the certified item and the current owner, wherein the verification of the chain of custody between the manufacturer of the certified item and the current owner occurs prior to making the at least one certified item available for presentation in a certified catalog of items and wherein available certified items are presented in the certified catalog anonymously, such that the current owner of the certified item is not revealed to potential buyers; and
   accommodating fulfillment of a transaction involving the certified item by receiving instructions corresponding to the transaction and making the certified item available to a shipper that ships the certified item to a given buyer without revealing the given buyer and the current owner to each other in association with the fulfillment of the transaction.

16. A method for buying items on a certified secondary market platform, the method comprising:
   accessing a certified catalog of certified items for sale on a secondary market, wherein the certified catalog of items includes at least one certified item available from a current owner, wherein the certified item is associated with item identification information and having a verified chain of custody between the manufacturer of the certified item and the current owner, wherein the verification of the chain of custody between the manufacturer of the certified item and the current owner occurs prior to the at least one certified item being made available for presentation in the certified catalog of items, and wherein the available certified items are presented in the certified catalog anonymously, such that the current owner of the certified item is not revealed to potential buyers;
   selecting the certified item for purchase; and
   submitting payment for the certified item to a provider of the certified secondary market platform, pursuant to fulfilling a transaction involving the certified item without receiving an identification of the current owner in association with the fulfillment of the transaction.

* * * * *